United States Patent

Kramer et al.

(10) Patent No.: US 9,767,066 B2
(45) Date of Patent: Sep. 19, 2017

(54) WIRELESS PROTOCOL COMMUNICATION BRIDGE AND SYSTEM COMPRISING BRIDGE

(71) Applicants: Mark Kramer, Castle Rock, CO (US); Wilfred Tucker, Centennial, CO (US); John Sample, Centennial, CO (US); Christopher Bermel, Denver, CO (US)

(72) Inventors: Mark Kramer, Castle Rock, CO (US); Wilfred Tucker, Centennial, CO (US); John Sample, Centennial, CO (US); Christopher Bermel, Denver, CO (US)

( * ) Notice: Subject to any disclaimer, the term of this patent is extended or adjusted under 35 U.S.C. 154(b) by 688 days.

(21) Appl. No.: 13/710,704

(22) Filed: Dec. 11, 2012

(65) Prior Publication Data
US 2014/0164658 A1    Jun. 12, 2014

(51) Int. Cl.
G06F 13/42 (2006.01)
G08B 1/00 (2006.01)
H04Q 1/30 (2006.01)
H04B 7/00 (2006.01)
H04M 1/00 (2006.01)

(52) U.S. Cl.
CPC ................................ *G06F 13/4282* (2013.01)

(58) Field of Classification Search
CPC ..... H04W 4/008; H04W 76/04; H04W 8/005; H04M 1/6066; H04M 2250/02; H04M 1/7253
USPC ............ 710/105; 340/531; 455/575.2, 569.1, 455/41.2
See application file for complete search history.

(56) References Cited

U.S. PATENT DOCUMENTS

| | | | |
|---|---|---|---|
| 6,356,529 B1 | 3/2002 | Zarom | |
| 6,452,910 B1 * | 9/2002 | Vij et al. | 370/310 |
| 6,937,615 B1 * | 8/2005 | Lazzarotto et al. | 370/465 |
| 6,970,909 B2 | 11/2005 | Schulzrinne | |
| 7,200,134 B2 | 4/2007 | Proctor, Jr. et al. | |
| 7,260,078 B1 | 8/2007 | Ledsham et al. | |
| 7,376,091 B1 * | 5/2008 | Eccles | H04W 92/02 370/265 |
| 7,444,401 B1 | 10/2008 | Keyghobad et al. | |
| 7,733,901 B2 | 6/2010 | Salkini et al. | |
| 7,903,724 B2 | 3/2011 | Rofougaran | |
| 7,953,400 B2 * | 5/2011 | Lee | H04L 63/0492 370/328 |
| 8,285,277 B2 | 10/2012 | Parker | |
| 8,472,372 B1 * | 6/2013 | Dulai et al. | 370/328 |

(Continued)

OTHER PUBLICATIONS

"Connect a game controller", Jan. 1, 2012, Xbox.com, retrieved from the Internet on Mar. 16, 2017 at <http://web.archive.org/web/20120101233826/http://support.xbox.com/en-US/xbox-360/accessories/connecting-game-controllers>.*

*Primary Examiner* — Faisal M Zaman
(74) *Attorney, Agent, or Firm* — Gearhart Law, LLC

(57) ABSTRACT

A bridge for linking a first and a second wireless communication device and translating between differing wireless protocols is described and taught. The bridge system comprises at least one wireless device and a bridge apparatus. The bridge apparatus takes the form of a universal serial bus that contains components that allows it to function without a host system. Additionally, the bridge apparatus enables the translation between different wireless protocols. This, in turn, enables older or outdated wireless technology to function seamlessly with the most current wireless protocols.

7 Claims, 3 Drawing Sheets

(56) References Cited

U.S. PATENT DOCUMENTS

| | | | |
|---|---|---|---|
| 2004/0014497 A1* | 1/2004 | Tjalldin | H04L 12/66 455/558 |
| 2004/0208156 A1* | 10/2004 | Chu | H04W 40/02 370/338 |
| 2006/0229100 A1* | 10/2006 | Born | 455/557 |
| 2006/0234630 A1* | 10/2006 | Lai | H04W 4/02 455/41.2 |
| 2007/0225034 A1 | 9/2007 | Schmidt | |
| 2008/0005262 A1* | 1/2008 | Wurzburg | G06F 13/4022 709/217 |
| 2008/0075034 A1* | 3/2008 | Hsieh | H04W 48/16 370/328 |
| 2008/0109581 A1* | 5/2008 | Pham | G06F 13/4045 710/58 |
| 2008/0119196 A1 | 5/2008 | Hamano et al. | |
| 2009/0006699 A1* | 1/2009 | Rofougaran | 710/304 |
| 2009/0034591 A1* | 2/2009 | Julian | H04W 4/206 375/220 |
| 2009/0158039 A1* | 6/2009 | Prasad | H04L 9/12 713/168 |
| 2010/0124213 A1* | 5/2010 | Ise | H04W 12/06 370/338 |
| 2010/0283579 A1* | 11/2010 | Kraus et al. | 340/5.7 |
| 2010/0293271 A1* | 11/2010 | Sato | H04L 69/24 709/224 |
| 2011/0029692 A1* | 2/2011 | Chassot | G06F 3/0227 710/8 |
| 2011/0159814 A1* | 6/2011 | Mallinson | G06F 3/005 455/41.2 |
| 2011/0304543 A1* | 12/2011 | Chen | G06F 3/038 345/163 |
| 2012/0093003 A1* | 4/2012 | Lin | G06F 3/038 370/242 |
| 2012/0106441 A1 | 5/2012 | Juneja et al. | |
| 2012/0113459 A1 | 5/2012 | Williams et al. | |
| 2013/0195091 A1* | 8/2013 | Gibbs et al. | 370/338 |
| 2015/0095493 A1* | 4/2015 | Xu | H04B 3/542 709/225 |

\* cited by examiner

WIRELESS PROTOCOL COMMUNICATION BRIDGE AND SYSTEM COMPRISING BRIDGE

FIELD

The field of the invention relates to an apparatus that enables communication between multiple wireless devices operating on different protocol stacks without the need for a host system.

BACKGROUND

Wireless communication means are well known and used frequently by a wide variety of individuals. These communications are achieved by various means which may include universal serial bus (USB) adapters and their associated communication partner, such as a wireless mouse for a computer system and the USB adapter.

In these types of systems, the need for a host system such as a computer is required for the apparatus' functionality. The device driver software installs onto the host systems upon inserting the USB adapter into a compliant USB port. Additionally, the host system requirement is necessary for various applications and communications stacks associated with the particular apparatus. Thus, the functionality of the apparatus and the locale flexibility are tied into the proximity between the apparatus and host system.

Existing USB adapters communicate using one particular protocol stack. One specific adapter may only communicate with devices compatible with Bluetooth wireless 2.1 protocol, whereas another device communicates solely with a Bluetooth wireless 4.0 protocol. These existing devices do not have backwards capabilities. Again, functionality of these devices is tied to not only a host system, but the specifications of the host system.

In view of the aforementioned limitations, there is a need for an improvement to be made to existing technology to combat these issues.

SUMMARY

According to a first aspect of the invention, there is a bridge between a first and a second wireless communication system. Each of the at least one wireless communication systems has a specific wireless protocol stack. Using existing technology, only one of these devices would be compatible and in communication with the bridge. However, the current improvement provides for seamless translation and communication between different wireless protocols.

These protocols may include, but are not limited to, Bluetooth, ANT, ZigBee, Wi-Fi, Wibree, and Z-wave. Thus, one wireless communication device may be operating on a specific Bluetooth wireless protocol and another may be operating on a specific ANT wireless protocol. Additionally, one wireless communication device may be operating on a specific Bluetooth wireless protocol and another may be operating on another distinct Bluetooth wireless protocol. In each situation, either intrasystem or intersystem, translation is enabled by the communication bridge system.

According to a second aspect of the invention, there is a bridge apparatus in the form of a universal serial bus (USB). This bridge apparatus contains its own central processing unit (CPU) and pre-installed firmware. The bridge apparatus operates with any USB compliant port once operably connected to said port. In another aspect of the invention, the bridge apparatus has at least one light emitting diode (LED).

In yet another aspect of the invention, the bridge apparatus has at least one depressible switch or button.

Advantageously, the inclusion of the pre-installed firmware removes the need for a host system for the communication bridge apparatus. There is no need to install an application, communication stack, or device driver. The apparatus, as a whole, is completely functional as a standalone receiver. The apparatus draws any electricity required for proper functioning directly from the associated USB port containing device such as a PC or laptop, mobile device, USB 115/220 VAC wall outlet power adapter, 12 Vdc USB vehicle power adapter, or battery pack.

BRIEF DESCRIPTION OF DRAWINGS

Embodiments of the present invention will now be described, by way of example only, with reference to the accompanying drawings, in which.

DETAILED DESCRIPTION

Figure 1:
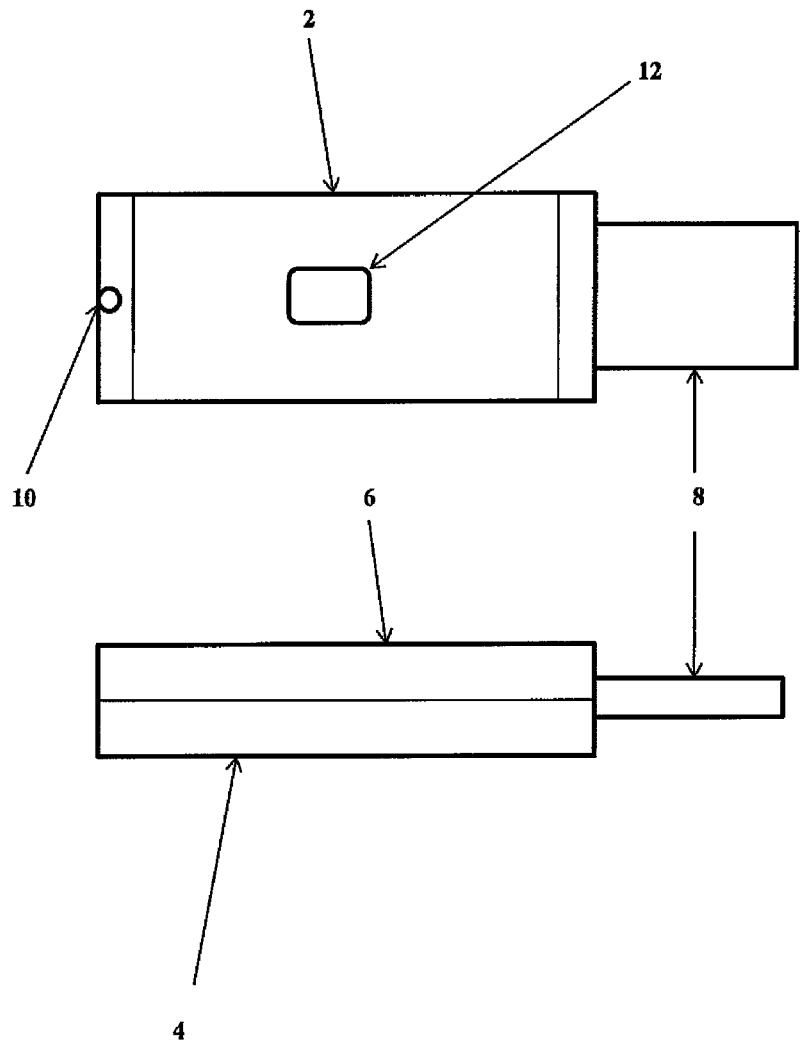
FIG. 1 illustrates a view of a preferred embodiment of the present invention.

Referring to the drawings, FIG. 1 refers to a preferred embodiment of the apparatus as a whole. The exterior casing 2 of the apparatus is comprised of two different sections. There is a top half of the exterior casing 6 and a bottom half of the exterior casing 4. Each half is joined to the other forming the exterior casing 2 as a whole. There is a universal serial bus connector 8 protruding from the exterior casing 2. The universal serial bus connector 8 may have a protective casing or a slideable casing for added protection. Additionally, there is a light emitting diode 10 which signifies to the user when the apparatus is in use and functioning correctly. A depressible button 12 sits upon the exterior casing 2 of the apparatus. The depressible button 12 enables the user to depress it to establish the initial connection to the wireless device(s) or to configure the apparatus.

Figure 2:
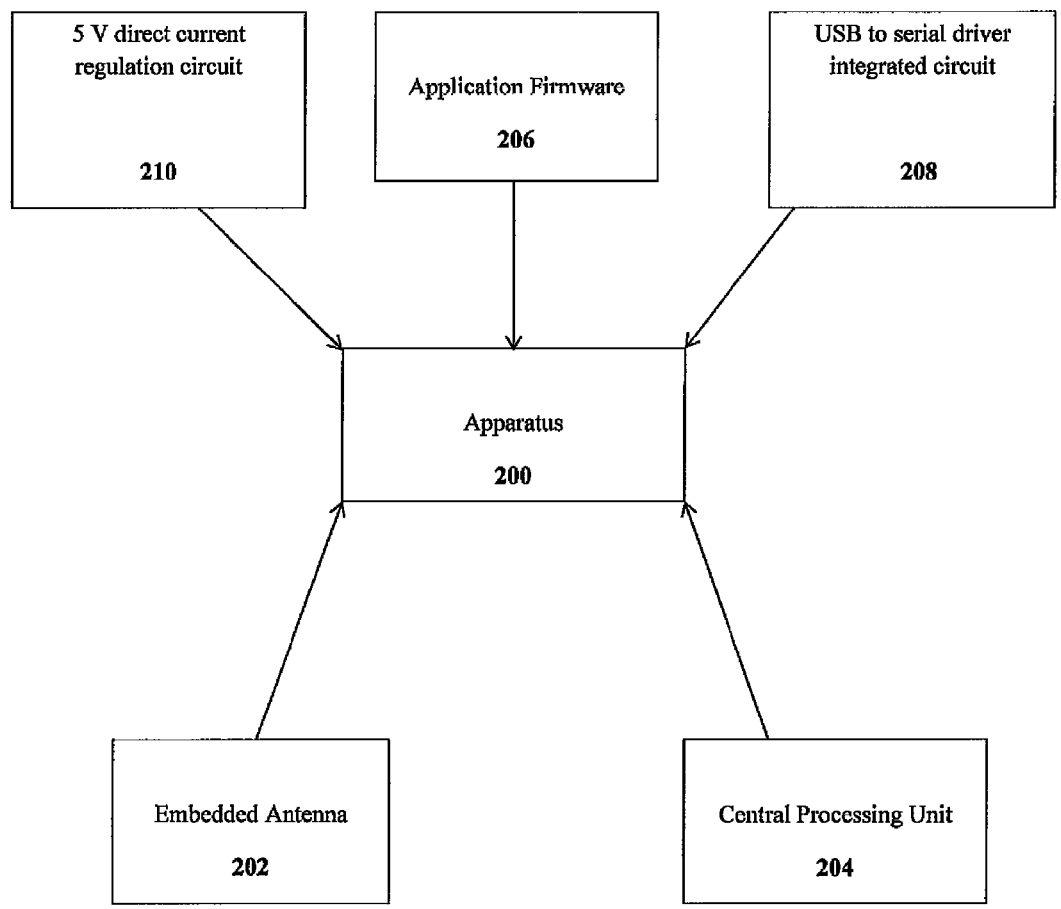
FIG. 2 is a schematic illustrating the components of a preferred embodiment of the present invention.

FIG. 2 shows a breakdown of the interior components of the apparatus. In a preferred embodiment of the apparatus 200, the interior components provide the main functionality of the apparatus 200. Here, the apparatus 200 contains an embedded antenna 202. The embedded antenna 202 provides the means for gathering an outside wireless signal and establishing the connection between the apparatus 200 and external wireless device. The central processing unit 204 runs the internal processes and is the "brain" of the apparatus 200. The firmware 206 allows the apparatus 200 to function as a standalone wireless receiver. The firmware 206 enables the device to operate without having previously installed any drivers for the apparatus 200. A universal serial bus to serial driver integrated circuit 208 is included to permit connections that may operate off serial connections and would otherwise not enable the apparatus 200 functionality. A 5 volt direct current regulation circuit 210 automatically keeps the device at an optimum and consistent voltage level.

Figure 3:
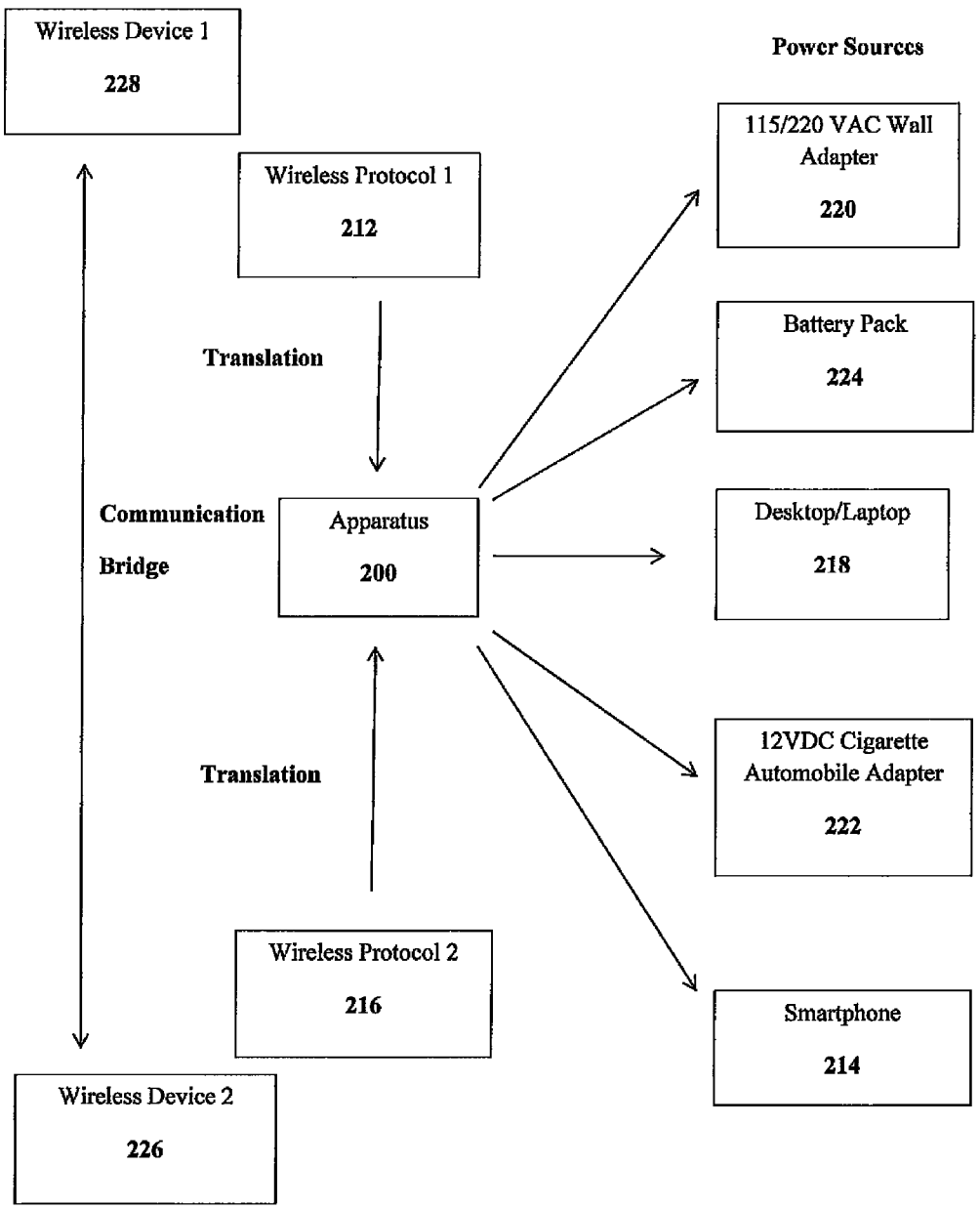
FIG. 3 is a schematic illustrating the communication bridge system as a whole.

The communication bridge as a whole, as shown by FIG. 3, has at least three main components: a wireless device, the apparatus, and a power source. The apparatus 200 functions as a standalone wireless receiver. However, there is still a need for a power source. This source may be any device with a universal serial bus adapter including a PC or laptop 218, 115/220 VAC wall adapter 220, 12 VDC cigarette automobile adapter 222, smartphone 214, or a battery pack 224. The PC or laptop 218 and smartphone 214 not only permit functionality but provide the means for user configuration of the apparatus 200 as well. In short, the device may be configured over the universal serial bus interface or through the 2.4 GHz wireless band.

With an adequate power supply, the apparatus 200 can connect to the desired wireless device(s). A user connects a device operating on wireless protocol 1 212 and a second device operating on wireless protocol 2 216. Each of the aforementioned wireless protocols may be any protocol within the 2.4 GHz wireless band. The internal components of the apparatus 200 make the translation between the multiple wireless protocols seamless and efficient. This forms the communication bridge as a whole.

What is claimed is:

1. A wireless communication system comprising:
   a first communication network and a second communication network, the first communication network having a specific wireless protocol stack and being associated with a first electronic device and the second communication network having a separate, specific wireless protocol stack and being associated with a second electronic device,
      wherein both the first communication network and the second communication network operate in a 2.4 GHz radio band; and
   a universal serial bus connector configured to be coupled to a universal serial bus receptacle establishing an operative connection between the universal serial bus connector and the first electronic device and the second electronic device,
      wherein the operative connection enables operation of firmware that translates wireless protocol stacks between the first communication network and the second communication network allowing the first electronic device to communicate with the second electronic device;
      wherein a depressible button of the universal serial bus connector is configured to, upon depression, establish a communicative connection with each of the first electronic device and the second electronic device; and
      wherein the firmware completes the translation between the first electronic device and the second electronic device once it is understood by the firmware the specific wireless protocol stack employed by the first electronic device and the separate, specific wireless protocol stack employed by the second electronic device.

2. The system of claim 1 wherein the translation occurs between two different wireless protocol stacks.

3. A wireless protocol communication bridge consisting of:
   a top half and a lower half operably connected forming an exterior casing, the exterior casing having a universal serial bus connector protruding therefrom;
   at least one depressible button,
      wherein the at least one depressible button causes an electronic device to establish a wireless communication with the wireless protocol communication bridge,
         wherein depression of the depressible button a first time is configured to establish a communicative connection with a first electronic device, and wherein depression of the depressible button a second time is configured to establish a communicative connection with a second electronic device;
   at least one light emitting diode;
   a universal serial bus to serial driver integrated circuit;
   an embedded central processing unit contained within the exterior casing, the embedded central processing unit having pre-installed application firmware,
      wherein the pre-installed application firmware translates wireless protocol stacks between a first communication network and a second communication network,
         wherein both the first communication network and the second communication network reside in a 2.4 GHz radio band,
         wherein a specific wireless protocol stack utilized by the first communication network is different than a separate, specific wireless protocol stack utilized by the second communication network,
         wherein the pre-installed application firmware completes the translation between the first electronic device and the second electronic device once it is understood by the pre-installed application firmware the specific wireless protocol stack employed by the first electronic device and the separate, specific wireless protocol stack employed by the second electronic device; and
   an embedded antenna contained within the exterior casing.

4. The wireless protocol communication bridge of claim 3 wherein the pre-installed application firmware operates independent of a host system.

5. The wireless protocol communication bridge of claim 3 wherein the universal serial bus connector operably connects to any compliant universal serial bus port.

6. The system of claim 1 wherein the firmware operates independent of a host system.

7. The system of claim 1 wherein when the depressible button is depressed for a first time the communicative connection is established with the first electronic device, and wherein the depressible button is depressed for a second time the communicative connection is established with the second electronic device.

* * * * *